United States Patent
Irie et al.

(10) Patent No.: US 8,783,405 B2
(45) Date of Patent: Jul. 22, 2014

(54) SADDLE-TYPE ELECTRIC VEHICLE

(75) Inventors: Takafumi Irie, Saitama (JP); Masayoshi Hori, Saitama (JP); Yoshinori Koyama, Saitama (JP); Tomoyasu Motojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 13/290,266

(22) Filed: Nov. 7, 2011

(65) Prior Publication Data

US 2012/0111651 A1 May 10, 2012

(30) Foreign Application Priority Data

Nov. 10, 2010 (JP) .................................. 2010-251780

(51) Int. Cl.
*B62K 11/04* (2006.01)
*B62M 7/04* (2006.01)

(52) U.S. Cl.
CPC .................. *B62K 11/04* (2013.01); *B62M 7/04* (2013.01); *B62K 2204/00* (2013.01)
USPC ........................... 180/312; 180/65.1; 180/220

(58) Field of Classification Search
USPC ............... 180/65.1, 219, 220, 312, 311, 68.5, 180/65.31
See application file for complete search history.

(56) References Cited

U.S. PATENT DOCUMENTS

| | | | | | |
|---|---|---|---|---|---|
| 3,991,843 | A | * | 11/1976 | Davidson | 180/206.1 |
| 4,280,581 | A | * | 7/1981 | Rudwick | 180/206.5 |
| 5,577,747 | A | * | 11/1996 | Ogawa et al. | 180/220 |
| 6,598,693 | B2 | * | 7/2003 | Honda et al. | 180/206.5 |
| 7,210,550 | B2 | * | 5/2007 | Yonehana et al. | 180/220 |
| 2002/0108798 | A1 | * | 8/2002 | Huntsberger et al. | 180/220 |
| 2013/0256049 | A1 | * | 10/2013 | Matsuda | 180/220 |

FOREIGN PATENT DOCUMENTS

| | | | |
|---|---|---|---|
| JP | 11-255176 | A | 9/1999 |
| JP | 2000-038183 | A | 2/2000 |
| JP | 2001-106162 | * | 4/2001 |
| JP | 2003-002270 | A | 1/2003 |
| JP | 2003-189539 | A | 7/2003 |

* cited by examiner

*Primary Examiner* — Katy M Ebner
*Assistant Examiner* — Emma K Frick
(74) *Attorney, Agent, or Firm* — Carrier Blackman & Associates, P.C.; William D. Blackman; Joseph P. Carrier

(57) ABSTRACT

A saddle-type electric vehicle is provided with a drive battery and an effectively placed motor unit. The drive battery is mounted directly under a main frame section of a vehicle frame, and the motor unit is fixedly supported to the vehicle frame. The motor unit includes a motor body disposed below a pivot connection of a rear swing arm, and at least a part of the motor body is disposed rearwardly of the pivot connection.

19 Claims, 10 Drawing Sheets

ND CROSS-REFERENCE TO RELATED APPLICATIONS

SADDLE-TYPE ELECTRIC VEHICLE

CROSS-REFERENCE TO RELATED APPLICATIONS

The present invention claims priority under 35 USC 119 based on Japanese patent application No. 2010-251780, filed on Nov. 10, 2010. The entire subject matter of this priority document, including specification claims and drawings thereof, is incorporated by reference herein.

BACKGROUND OF THE INVENTION

1. Field of the Invention

The present invention relates to saddle-type electric vehicle, such as a two-wheeled electric motorcycle. More particularly, the present invention relates to saddle-type electric vehicle in which a drive assembly, including an electric motor and battery for an electric motorcycle, are compactly and efficiently arranged on a frame of the vehicle.

2. Description of the Background Art

There are a number of known saddle-type electric vehicles, including a vehicle having a drive motor unit fixedly supported under a main frame section extending rearwardly from a head pipe of a vehicle frame, and a drive battery disposed below the drive motor unit (see, for example, Japanese published Patent Document JP-A 2000-038183). In the vehicle of the referenced publication, a drive motor unit includes a motor body, mounted in its front portion, and a transmission (driven element) extending toward the rear of the motor body. Also in the vehicle of this referenced publication, a rear end of the transmission is located forward of a pivot connection of a rear swing arm.

In the above-described known structure, because the drive battery is placed in a lower portion of the vehicle body, there is a limited amount of installation space available for the battery. Therefore, a need exists for an electric saddle-type vehicle with increased space provided on the frame for permitting installation of a battery on the frame, for the purpose of increasing the mileage.

SUMMARY OF THE INVENTION

A possible way to address the problem of increasing battery installation space is that the drive battery is installed in a place directly underneath the main frame section where a relatively large space is provided. This area is normally used for supporting the drive motor unit, but on the other hand, placing the battery directly under the main frame section gives rise to the problem of where else to place the drive motor unit.

To address this, the present invention provides a saddle-type electric vehicle with enough space ensured to install a battery and an effectively placed drive motor unit.

To address this technical problem, the invention according to a first aspect hereof provides a saddle-type electric vehicle including a drive battery (2) mounted directly under a main frame (13) of a vehicle frame (11); and a drive motor unit (3) fixedly supported to the vehicle frame (11), wherein a motor body (3a) of the drive motor unit (3) is placed below a pivot connection (17a) of a rear swing arm (14), and at least a part of the motor body (3a) is placed in back of the pivot connection (17a).

Note that the saddle-type electric vehicle includes all vehicles ridden by a rider straddling the vehicle body, including not only motorcycles, but also three-wheeled vehicles (including vehicles with a front wheel and two rear wheels as well as vehicles with two front wheels and a rear wheel) or four-wheeled vehicles.

In the invention according to a second aspect hereof, a drive axis (C1) of the motor body (3a) is placed in back of the pivot connection (17a).

In the invention according to a third aspect hereof, the entire motor body (3a) is placed in back of the pivot connection (17a).

In the invention according to a fourth aspect hereof, the drive motor unit (3) has a driven element (28) operating by receiving a drive force of the motor body (3a), the motor body (3a) is disposed offset on one side of the vehicle lateral center (CL) in the right-left direction, and the driven element (28) is disposed on the other side opposite to the motor body (3a) in the right-left direction.

In the invention according to a fifth aspect hereof, an output shaft (28a) of the driven element (28) is placed in back of a drive shaft (3b) of the motor body (3a).

In the invention according to a sixth aspect hereof, an output shaft (28a) of the driven element (28) is placed in back of the pivot connection (17a).

Advantageous Effects of Invention

According to the first aspect of the invention, even when the place for supporting a drive motor unit in the related art is used as an installation space for a drive battery, the placement position of the drive motor unit can be moved rearward without displacing a pivot position toward the rear. That is, not only a large space for installing the battery is ensured, but also the drive motor unit can be effectively placed.

According to the second and third aspects of the invention, since the drive motor unit is placed as far back as possible, a more increase in space for mounting the battery can be achieved.

According to the fourth aspect of the invention, increases in the fore-and-aft length and the up-and-down length of the drive motor unit can be minimized to increase the flexibility in placement of the drive motor unit and to achieve a more increase in space for installing the battery.

According to the fifth and sixth aspects of the invention, it is possible to increase the space for installing the driven element in the fore and aft directions.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENT

Figure 1A:
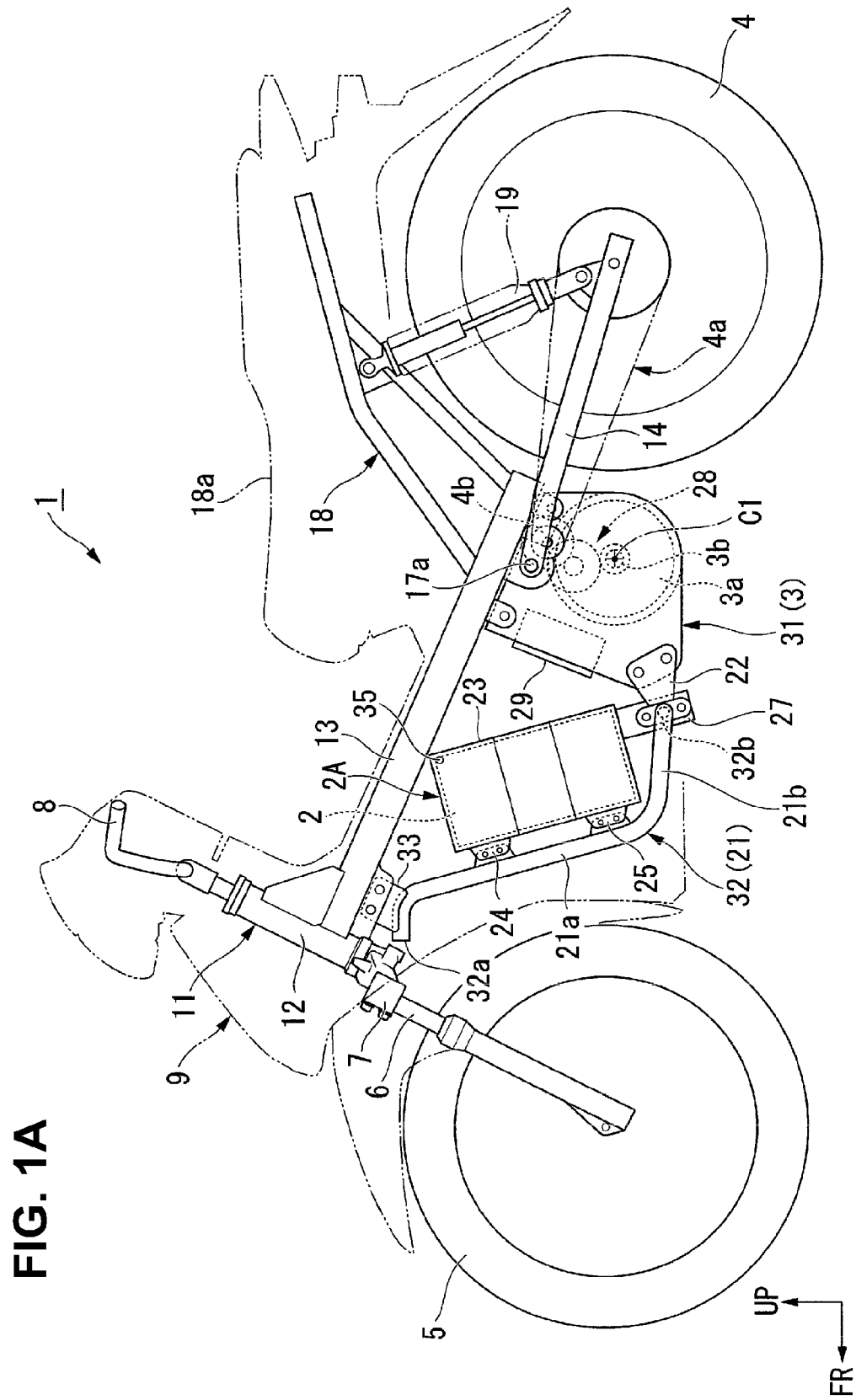
FIG. 1A is a left side plan view of a saddle-type electric vehicle according to a first illustrative embodiment of the present invention.

Descriptions will be provided below of a selected illustrative embodiment of the present invention as an example of the present invention, supported by and shown in the accompanying drawings. It should be understood that only structures considered necessary for clarifying the present invention are described herein. Other conventional structures, and those of ancillary and auxiliary components of the system, will be known and understood by those skilled in the art.

In the following detailed description, relative positional terms such as "front side", "right side" and "left side" correspond to those directions considered from the vantage point of a vehicle operator, seated on the driver's seat and facing forwardly. The forward, rearward, leftward and rightward directions and the like set forth in the following description refer to the same directions as those in the vehicle illustrated below unless otherwise specified. The arrow FR representing the forward direction of the vehicle, the arrow LH representing the leftward direction of the vehicle and the arrow UP representing the upward direction of the vehicle are shown in appropriate positions in the drawings corresponding to the following description.

FIG. 1A is a left side plan view of a saddle-type electric vehicle according to an illustrative embodiment of the present invention. The saddle-type electric vehicle 1 illustrated in FIG. 1A has a travel battery (drive battery) 2 mounted in a front central portion of a vehicle frame 11 which is a major component of the vehicle body, and a travel motor unit 3 mounted in a rear central portion of the vehicle body. The motor unit (drive motor unit) 3 is driven by electric power from the battery 2, and then drive force generated by the motor unit 3 is transferred to the rear wheel 4 via a drive chain 4a, to spin the rear wheel and drive the vehicle forwardly.

The saddle-type electric vehicle 1 has the appearance of a motorcycle, of which the front wheel 5 is journaled to lower ends of a pair of right and left front forks 6, and the top ends of the right and left front forks 6 are pivotally supported via a steering stem 7 on a head pipe 12 at the front end of a vehicle frame 11 so as to allow steering operation. A steering handlebar 8 is mounted on the top of the steering stem 7.

A single main frame section 13 extends rearwardly and downwardly from the head pipe 12 along the center in the right-left direction of the vehicle body. An upper end of the motor unit 3 is fixedly supported at a rear undersurface of the main frame section 13, while the front end of a swing arm (rear swing arm) 14 is pivotally supported on the frame 11, so as to be capable of swinging vertically with respect thereto. A rear wheel 4 is rotatably attached to the rear end of the swing arm 14.

Figure 2:
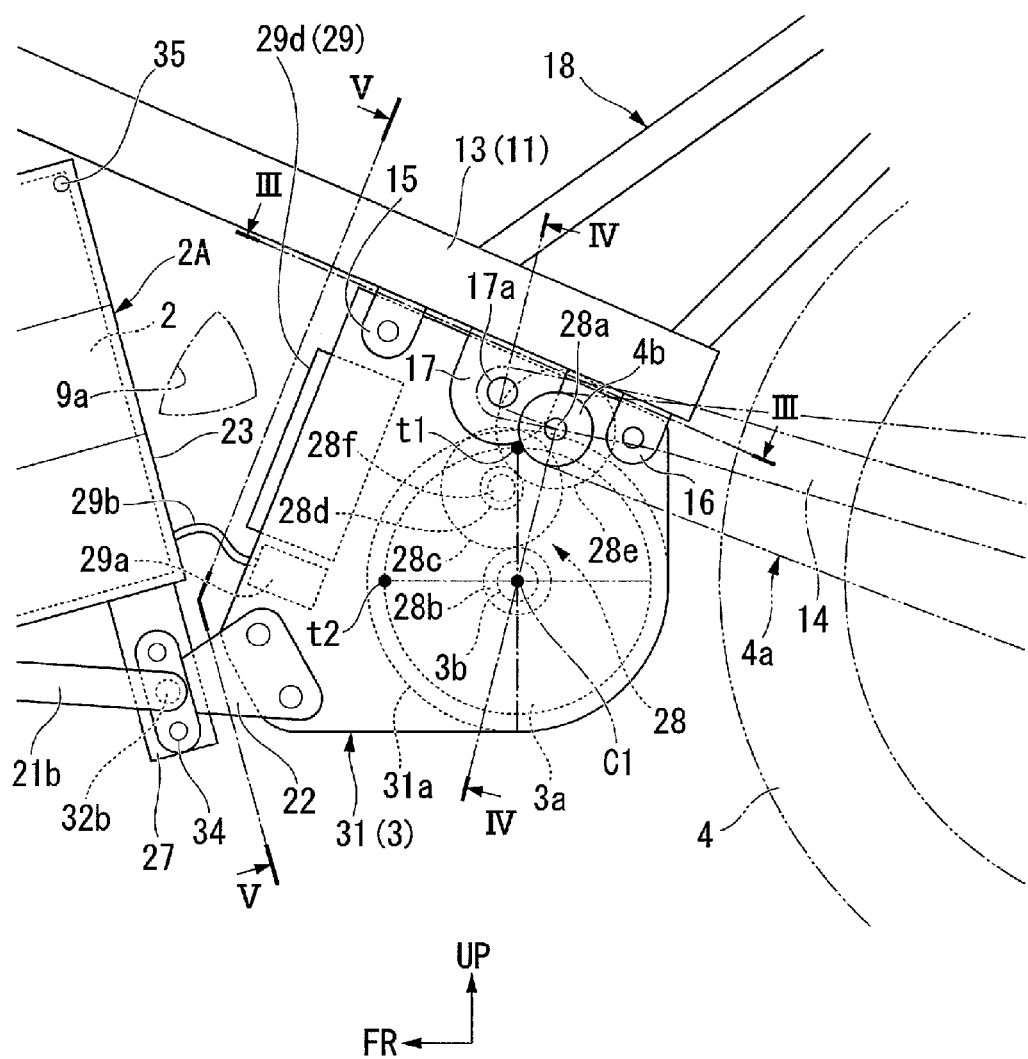
FIG. 2 is an enlarged view of a lower central portion of the electric vehicle of FIG. 1A.
Figure 3:
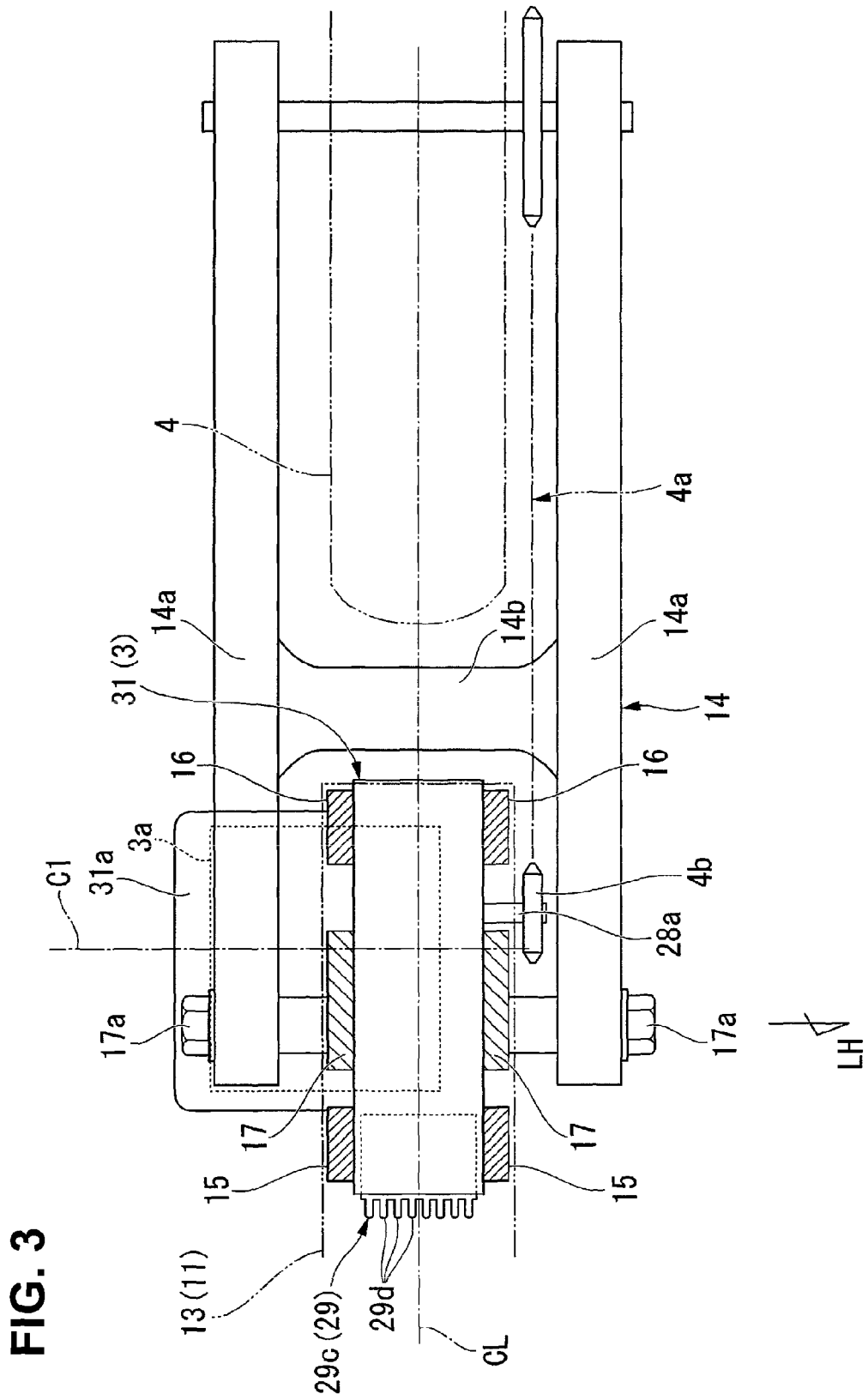
FIG. 3 is a sectional view taken along the line III-III in FIG. 2.

As illustrated in FIGS. 2-3, two pairs of spaced-apart front and rear motor support brackets 15, 16 are provided on the lower side of a rear portion of the main frame section 13. As shown in FIG. 3, each pair of motor support brackets 15, 16 includes both right and left motor support brackets. The top end of the motor unit 3 is fitted between the right and left front motor support brackets 15 and between the right and left rear motor support brackets 16, which are respectively coupled together by bolt-fastening or the like, so that the top end of the motor unit 3 is stably supported on the lower side of the rear portion of the main frame section 13.

Figure 4:
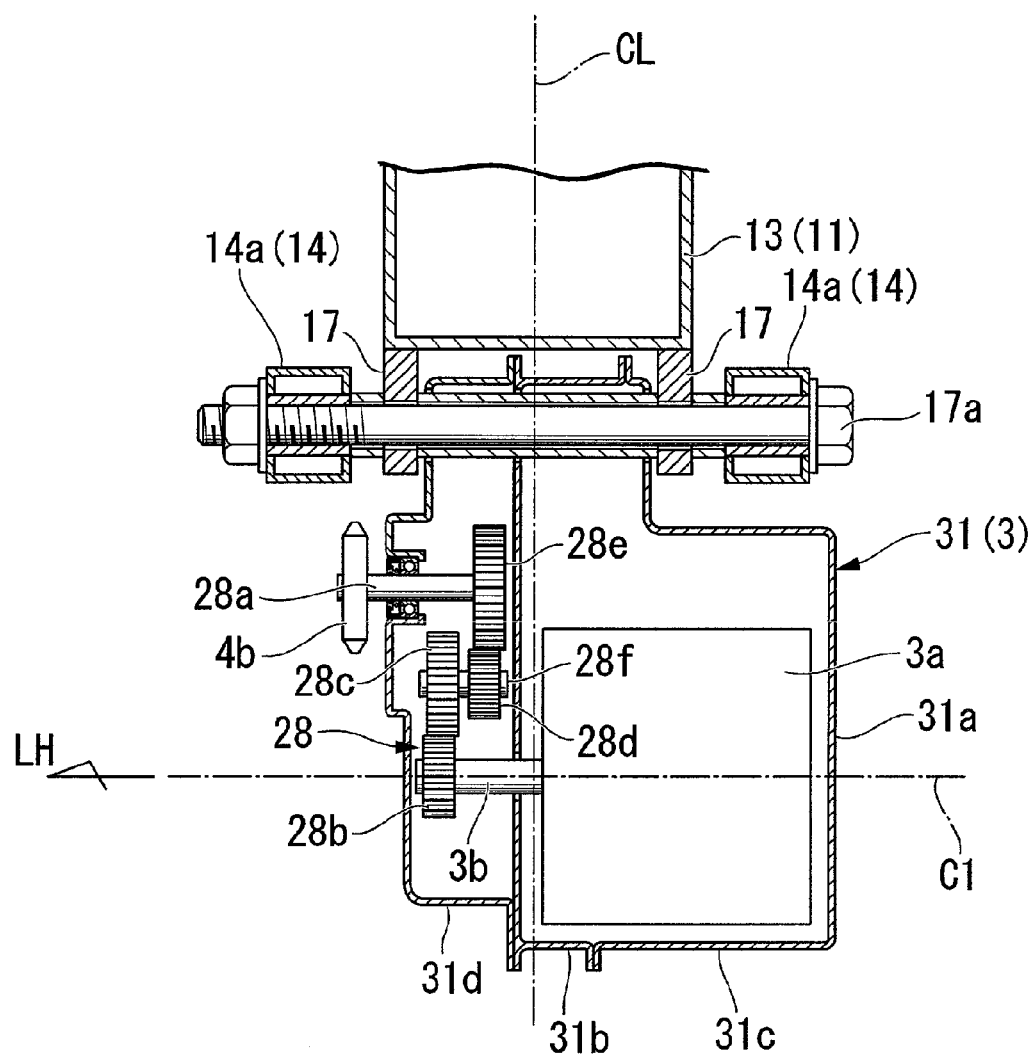
FIG. 4 is a sectional view taken along the line IV-IV in FIG. 2.

Additionally referring to FIG. 4, a pair of right and left pivot brackets 17 is also provided under the rear portion of the main frame section 13, and these pivot brackets 17 are situated between the front and rear motor support brackets 15, 16. The front ends of the right and left arm portions 14a of the swing arm 14 are placed respectively on the outsides of the right and left pivot brackets 17 in the vehicle width direction (the right-left direction) so that the right and left pivot brackets 17, and the right and left arm portions 14a are pivotally connected to pivot brackets 17 of the frame 11 through a pivot connection 17a formed of, for example, a bolt. Also as seen in FIG. 3, a crossmember extends between front portions of the right and left arm portions 14a to fixedly couple the arm portions together.

Referring again to FIG. 1A, a down tube 21 extends downward from a lower front end part of the main frame section 13. The down tube 21 is curved so as to extend rearwardly at a lower portion of the vehicle body, and is arranged so that a rear end of the down tube 21 is coupled to a lower front part of the motor unit 3 via a coupling bracket 22. In addition, as shown in FIGS. 1 and 2, an upper end of the motor unit 3 is affixed to a rear end portion of the main frame section 13 at the motor support brackets 15, 16. It will therefore be seen that the casing 31 of the motor unit 3 is disposed between, and interconnects respective rear end portions of the main frame section 13 and the left and right down tubes 21. In this way, the casing 31 of the motor unit 3 functions as part of the vehicle frame 11. The portion of the down tube 21 extending downwardly from the lower side of the front end of the main frame section 13 will be hereinafter referred to as a downward extension 21a, and the portion extending rearwardly in the lower portion of the vehicle body will be hereinafter referred to as a rearward extension 21b.

A seat frame 18 extends rearwardly and upwardly from a rear portion of the main frame section 13. A seat 18a for an occupant to sit on is supported on the seat frame 18. A shock absorber unit 19 is interposed between the seat frame 18 and the rear end of the swing arm 14. The vehicle body of the motorcycle 1 may be covered with a vehicle cover 9, as appropriate.

The battery 2 is mounted in a position directly under the front portion of the main frame section 13 and just to the rear of the down tube extension portion 21a of the down tube 21.

The battery 2 is made up, for example, of a plurality of single batteries connected in a cascade arrangement to produce a predetermined high voltage (48-72V), and is housed in a battery case 23 of a rectangular parallelepiped box-like shape arranged adjacent and proximate the down tube extension 21a when viewed from the side. The battery 2 and the battery case 23 cooperate to form an integrated battery unit 2A. The down tube extension 21a and the battery case 23 are each respectively situated in an inclined position, as shown, in which the longitudinal direction leans somewhat forward with respect to a vertical line, when viewed from the side. As shown in FIG. 1, in the depicted embodiment, the battery case 23 is arranged so that an edge portion thereof is substantially parallel to the down tube extension 21 on which the battery unit 2A is mounted.

The battery is an energy storage battery which is chargeable/dischargeable as appropriate, and is formed of, for example, a lithium-ion battery, a nickel metal hydride battery, a zinc battery or other appropriate electrical storage medium.

Upper and lower coupling bosses 24, 25 are respectively integrally formed with front upper and lower portions of the battery 2 (battery case 23), and are attached to the down tube extension 21a by bolt-fastening or the like. A downward protrusion (cooling-air inlet) 27 is formed integrally with a rear portion of a bottom end of the battery 2 (battery case 23) and this downward protrusion is attached to a rear end of the rearward extension 21b of the down tube 21 by bolt-fastening or the like. Therefore, the battery 2 is fixedly but detachably attached to the vehicle frame 11 and the motor unit 3 via the upper and lower coupling bosses 24, 25 and the downward protrusion 27.

Figure 8:
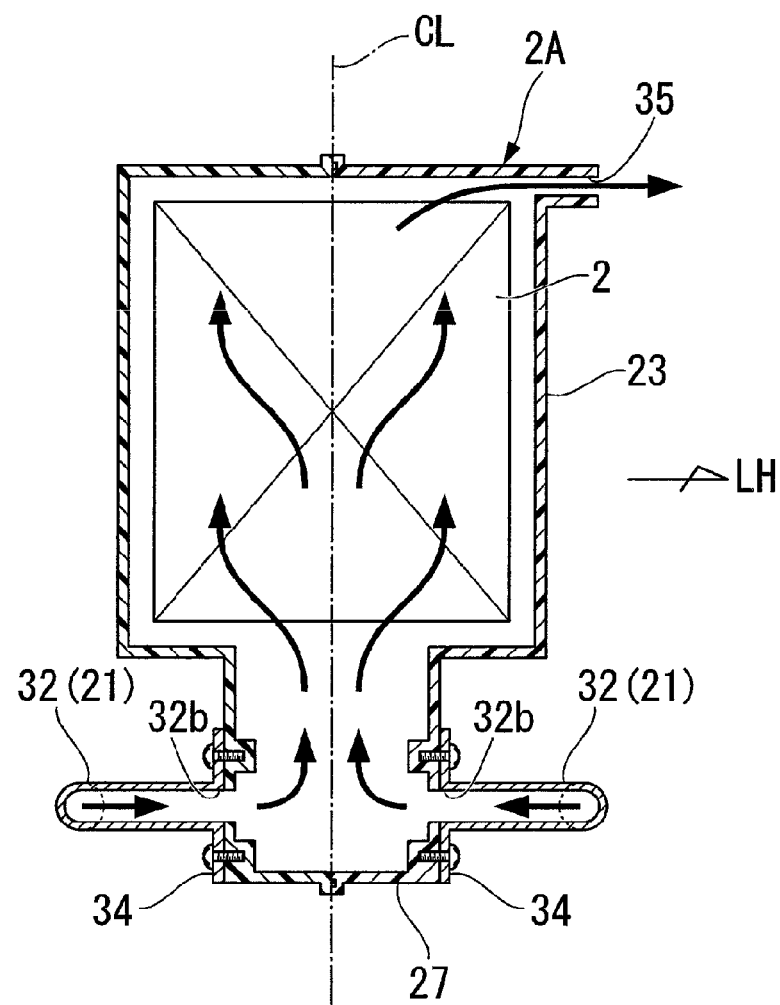
FIG. 8 is a sectional view taken along the line VIII-VIII in FIG. 5.

The downward protrusion 27 is shaped in a hollow form communicating with the interior space of the battery case 23 (see FIG. 8). The right and left rear ends of the rearward extension 21b of the down tube 21 are coupled respectively to the right and left side portions of the downward protrusion 27 by bolt-fastening or the like. The front end of the coupling bracket 22 is integrally coupled to the rear end of the rearward extension 21b by welding or by fastening the front end together with the downward protrusion 27 to the coupling bracket 22. As a result, the lower end of the battery case 23 (battery 2) is immovably and detachably supported on the down tube 21 and the motor unit 3.

As illustrated in FIGS. 2, 4, the motor unit 3 has a structure in which: a motor body 3a having a rotational center axis (drive axis) C1 along the right-left direction, and a reduction gear mechanism 28 which is a driven element of the motor body 3a are disposed adjacent to each other side by side in a rear portion of the motor unit 3; a control unit 29 including a combination of a PDU (Power Driver Unit) which is a motor driver and an ECU (Electric Control Unit) controlling the PDU is disposed in a front portion of the motor unit 3; a contactor 29a is disposed underneath the control unit 29, and a single casing 31 houses these components. Reference number 29b in FIG. 2 denotes a battery output cable extending from the battery 2 to the contactor 29a. Both the motor support brackets 15, 16 and the coupling bracket 22 are attached to the casing 31.

The rotational drive force of the motor body 3a is output via the reduction gear mechanism 28 (which is a parallel axis gear mechanism) to the output shaft (serving as an external output of the motor unit 3) 28a of the reduction gear mechanism 28, and then transferred via, for example, a chain transmission mechanism 4a to the rear wheel 4. Note that the motor body 3a is operated under, for example, VVVF (Variable Voltage Variable Frequency) control, but may be structured to have a manual or automatic transmission or clutch.

The reduction gear mechanism 28 has a small-diameter gear 28b provided at the leading end of the drive shaft 3b of the motor body 3a, a large-diameter gear 28c meshing with the small-diameter gear 28b, a second small-diameter gear 28d adjacent to the right side of the large-diameter gear 28c, and a second large-diameter gear 28e meshing with the second small-diameter gear 28d. The output shaft 28a protrudes in the leftward direction of the second large-diameter gear 28e. An idle shaft 28f supporting the large-diameter gear 28c and the second small-diameter gear 28d is placed offset in a forward position with respect to the drive shaft 3b and the output shaft 28a. As a result, a reduction ratio can be gained while the height of the reduction gear mechanism 28 can be limited.

Additionally referring to FIG. 3, the motor body 3a is placed offset in a rightward position with respect to the vehicle lateral center CL. A bottomed cylindrical motor housing 31a extending out in the rightward direction is formed on a rear right side of a lower portion of the casing 31 for housing a right portion of the motor body 3a. The casing 31 includes a left-side portion 31b extending out across the vehicle lateral center CL, a right-side portion 31c forming part of the motor housing 31a, and a gear case 31d housing the reduction gear mechanism 28.

Figure 5:
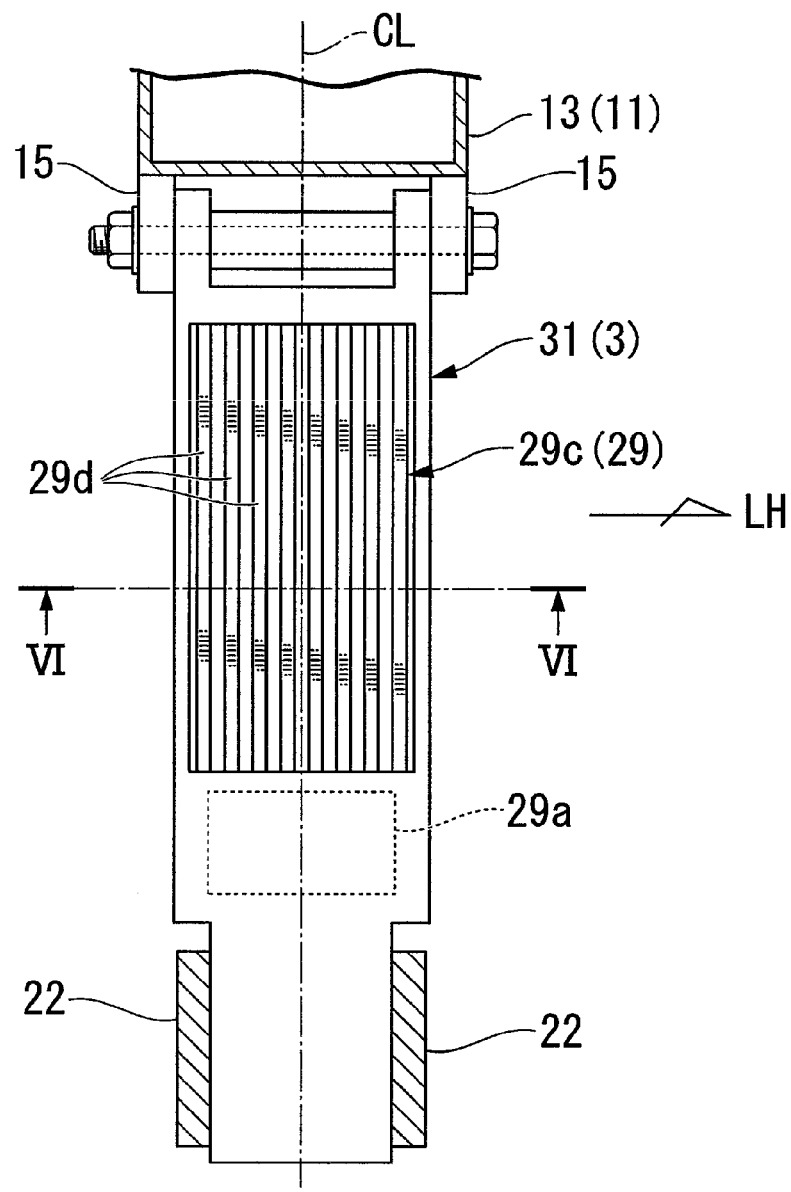
FIG. 5 is a sectional view taken along the line V-V in FIG. 2.
Figure 6:
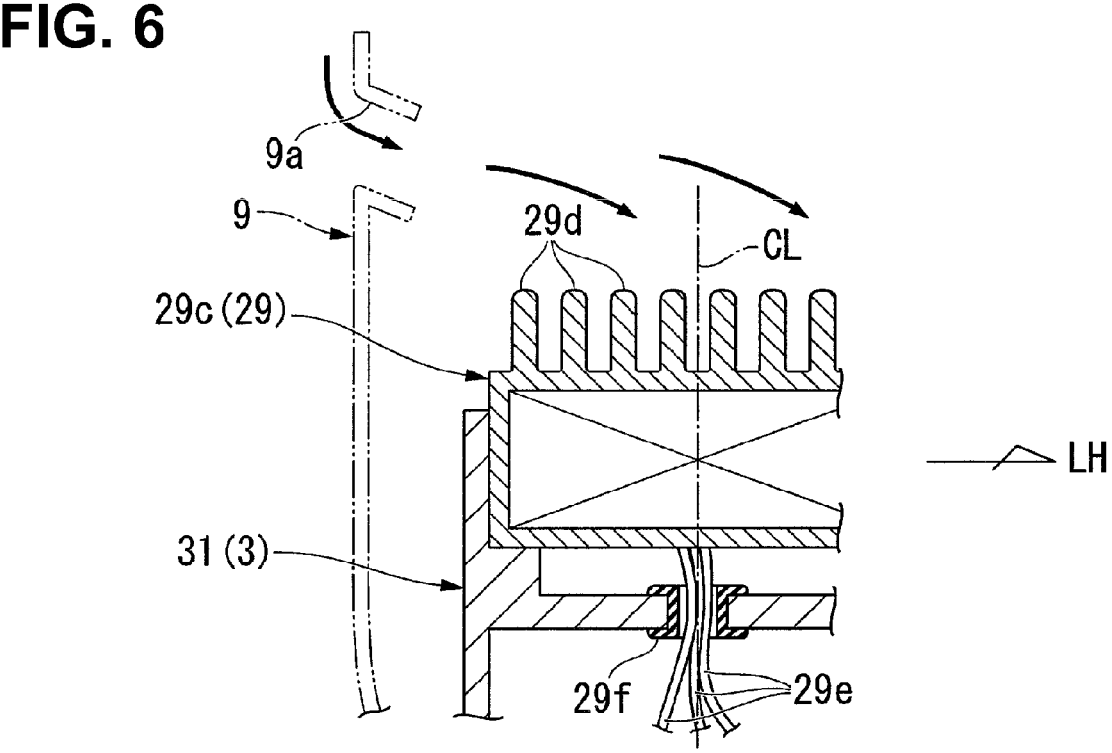
FIG. 6 is a sectional view taken along the line VI-VI in FIG. 5.

As illustrated in FIGS. 2 and 5-6, the control unit 29 has the front of its outer case 29c exposed forward from the front of the casing 31 of the motor unit 3. A plurality of vertically extending radiating fins 29d is formed on the front of the outer case 29c. The radiating fins 29d receive a supply of vehicle-running wind taken in into the inside of the cover from, for example, a wind intake port 9a formed in the vehicle cover 9. As a result, the warm air from an air-exhaust outlet 35 of the battery case 23 is inhibited from impairing the cooling capability of the control unit and the like.

The air exhausted from the air-exhaust outlet 35 is carried by the vehicle-running wind being taken in from the wind intake port 9a and then flowing downward along the radiating fins 29d of the control unit 29, thus increasing the rate of flow of vehicle-running wind (cooling air) of the air within the battery case 23.

Note that reference number 29e in FIG. 6 denotes three-phase motor cables extending from the control unit 29 to the motor body 3a, while reference number 29f denotes a grommet mounted in the casing 31 for insertion of the motor cables 29e.

As illustrated in FIG. 2, the motor body 3a is placed such that its top end t1 is situated below the pivot connection 17a (that is, the entire motor body 3a is situated below the pivot connection 17a). Thus, a change in placement of the pivot connection 17a to a backward position is minimized, while the motor body 3a can move backward as far as possible.

Figure 1B:
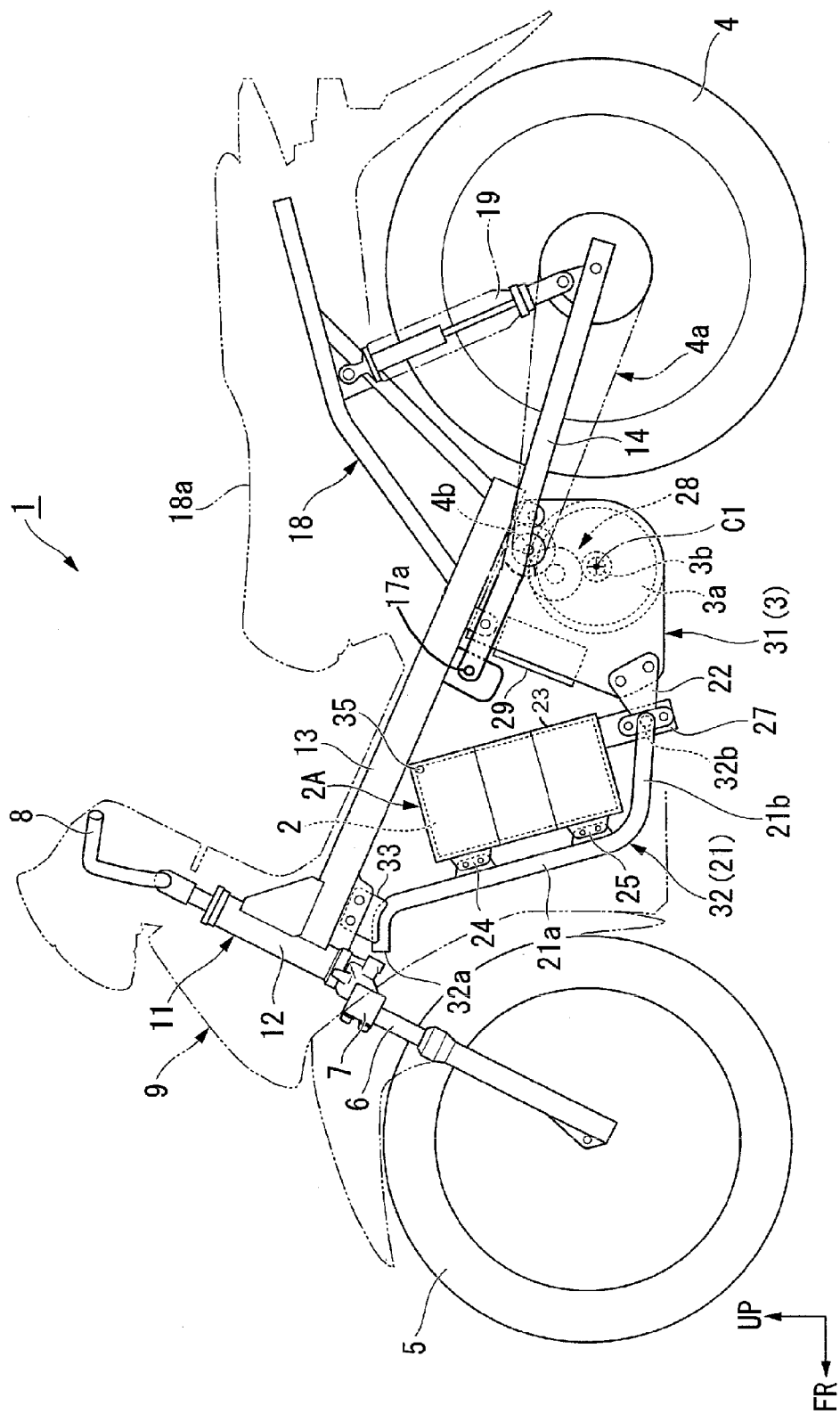
FIG. 1B is a left side plan view of a saddle-type electric vehicle according to a second illustrative embodiment of the present invention.

In FIG. 2, the motor body 3a is placed such that its rear portion is situated behind and below the pivot connection 17a (further, such that the drive axis C1 is situated rearwardly of the pivot connection 17a). FIG. 2 illustrates a front end t2 of the motor body 3a located in front of the pivot connection 17a, but in a modified embodiment of the invention, as shown in FIG. 1B, the front end t2 may, alternatively, be located in back of the pivot connection 17a (the entire motor body 3a may be located in back of the pivot connection 17a).

In this manner, while the rearward movement of the pivot connection 17a is stopped to limit the influence on the length of the swing arm 14 and the wheelbase, the motor body 3a can be placed as far back as possible to contribute to the expansion of the space for mounting the battery. Also, the downward placement of the relatively heavy motor body 3a makes it possible to contribute to the lower center of gravity of the saddle-type electric vehicle 1. In addition, since the motor body 3a and the reduction gear mechanism 28 which is the driven element of the motor body 3a are placed adjacent to each other in the right-left direction, increases in the fore-aft length and the up-down length of the area around the motor body 3a can be minimized to improve the degree of flexibility in placement of the pivot connection 17a.

The output shaft 28a of the motor unit 3 is situated in a position between the pivot connection 17a and the drive shaft 3b of the motor body 3a in the up-down direction. A drive sprocket 4b of the chain transmission mechanism 4a is attached to a portion (the left end) of the output shaft 28a extending from the casing 31 such that the drive sprocket 4b can rotate integrally (see FIGS. 3, 4). Thus, the drive sprocket 4b is situated near the pivot connection 17a.

Figure 7:
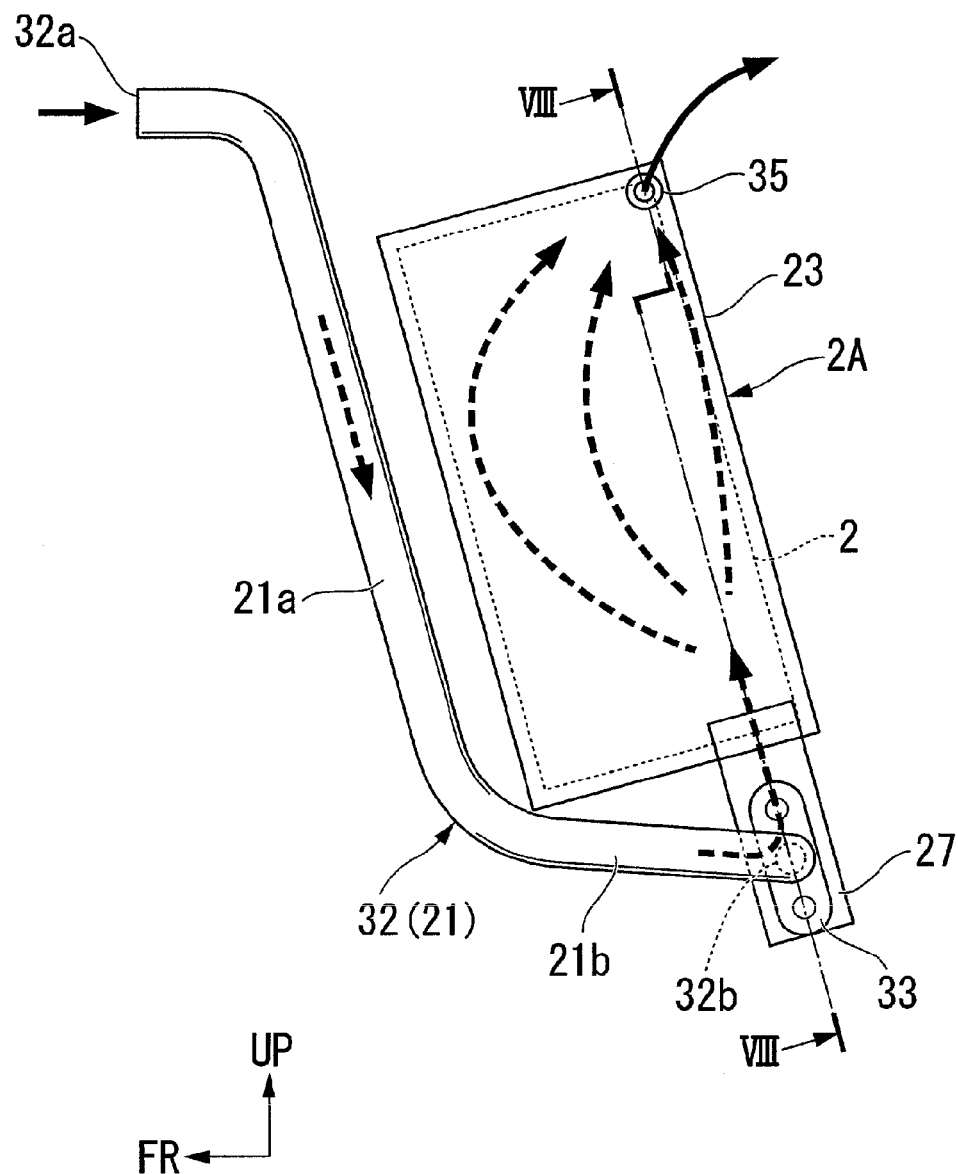
FIG. 7 is a left side view illustrating a cooling structure of a battery unit of the saddle-type electric vehicle of FIG. 1A.

As illustrated in FIGS. 7, 8, the down tube 21 has a function as a vehicle-running-wind introduction duct for introducing the vehicle-running wind into the battery case 23, for cooling the battery.

Figure 9:
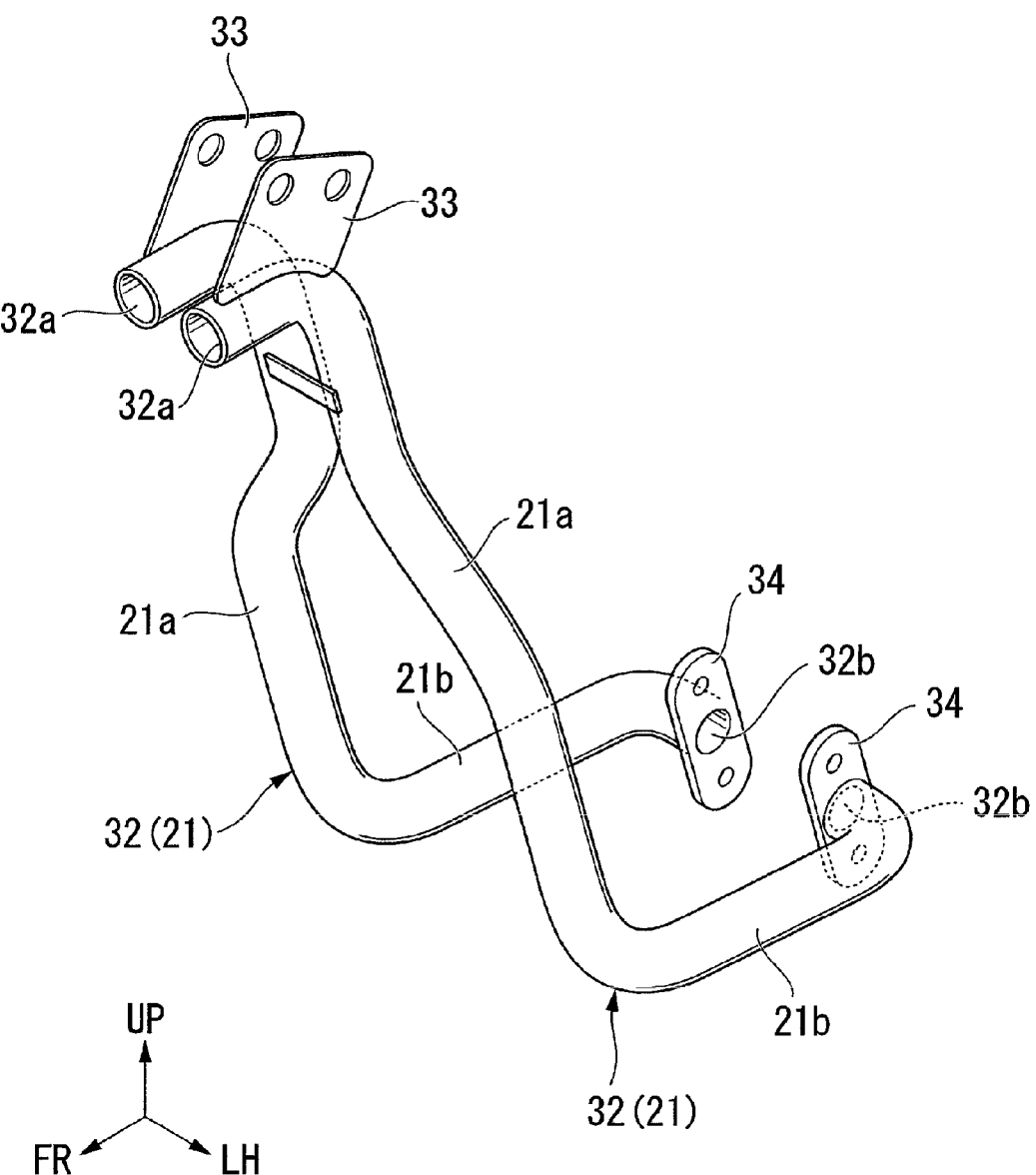
FIG. 9 is a perspective view of a down frame which is a component of the saddle-type electric vehicle of FIG. 1A.

Additionally referring to FIG. 9, the down tube 21 includes, for example, a pair of right and left down tubes 32. Each of the right and left down tubes 32 is formed out of a circular-shaped steel pipe bent into a desired shape, which has a forward-bent top end portion, which is open toward the vehicle front, and a rear end which is bent inward in the right-left direction and is configured to be coupled to a corresponding one of the right and left sides of the downward protrusion 27 of the battery case 23. The top-end openings of the right and left down tubes 32 serve as vehicle-running-wind inlets 32a, while the lower rear openings of the right and left down tubes 32 serve as vehicle-running-wind outlets 32b.

Support brackets 33 are fixedly provided on the top ends of the down tube 21, and are detachably secured to the underside of the front end of the main frame section 13 by bolt-fastening or the like (see FIG. 1A). On the other hand, the rear ends of the down tube 21 are detachably secured to the downward protrusion 27 of the battery case 23 by bolt-fastening or the like as described earlier. Reference number 34 in FIG. 9 denotes a fixing flange provided on the inner rear end portion of each of the right and left down tubes 32.

The battery case 23 houses the battery 2 with a predetermined gap. The vehicle-running wind, introduced into the battery case 23 from the downward protrusion 27 of the down tube 21, draws heat from the battery 2, thus gradually resulting in an upward air current which flows upwardly within the battery case 23 and then exits the case from the air-exhaust outlet 35 formed, for example, in a rear side of the top end of the battery case 23. Note that an electronic BMU (Battery Managing Unit), not shown, for monitoring charging/discharging conditions, temperatures and the like of the battery 2, is housed in the battery case 23 and handled as a combination with the battery 2.

As described above, the saddle-type electric vehicle 1 according to the depicted embodiment includes the drive battery 2 mounted directly under the main frame section 13 of the vehicle frame 11 and the motor unit 3 fixedly supported to the vehicle frame 11, in which the motor unit 3 is placed below the pivot connection 17a of the swing arm 14. This contributes to a low center of gravity of the vehicle 1, which helps in stable handling and operation thereof.

With this structure, even when the place under the main frame section 13, which was previously used for supporting the motor unit 3 in the related art, is used as an installation space for the drive battery 2, the placement position of the motor unit 3 can be moved rearwardly without displacing the pivot position toward the rear. That is, not only a large space for installing the battery is ensured, but also the motor unit 3 can be effectively placed.

In the aforementioned saddle-type electric vehicle 1, at least a part of the motor unit 3 is placed in back of the pivot connection 17a, the drive axis C1 of the motor unit 3 is placed in back of the pivot connection 17a, or the entire motor unit 3 is placed in back of the pivot connection 17a.

With this structure, a further increase in the space for installing the battery can be achieved by placement of the motor unit 3 as far back as possible.

Also, in the aforementioned saddle-type electric vehicle 1, the motor unit 3 has a motor body 3a having a drive axis C1 oriented along the right-left direction, and a driven element (a reduction gear mechanism 28) operating by receiving the drive force of the motor body 3a. The motor body 3a is disposed offset on a first side of the vehicle lateral center CL in the right-left direction, while the driven element is disposed on a second side of the vehicle lateral center CL, and is arranged substantially opposite to the motor body 3a in the right-left direction.

With this structure, increases in the fore-and-aft length and the up-and-down length of the motor unit 3 can be minimized to increase the flexibility in placement of the motor unit 3 and to achieve a more increase in battery installation space.

It should be understood that the present invention is not limited to the aforementioned embodiment, and, for example, the saddle-type electric vehicle includes all vehicles ridden by a rider straddling the vehicle body, including not only motorcycles, but also three-wheeled vehicles (including vehicles with a front wheel and two rear wheels as well as vehicles with two front wheels and a rear wheel) or four-wheeled vehicles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A saddle-type electric vehicle comprising:
   a vehicle frame comprising a main frame section and a down tube attached to and extending downwardly from a front end of the main frame section;
   a rear swing arm which is pivotally attached to the vehicle frame at a pivot connection;
   a drive battery unit comprising a battery case and a battery housed inside of the battery case, the drive battery unit operatively attached to the down tube and situated under the main frame section of the vehicle frame; and
   a drive motor unit operatively attached to the vehicle frame;
   wherein the drive motor unit comprises a motor body disposed behind the drive battery unit and entirely below the pivot connection of the rear swing arm, and wherein at least part of the motor body is disposed rearwardly of the pivot connection.

2. The saddle-type electric vehicle according to claim 1, wherein a drive axis of the motor body is disposed rearwardly of the pivot connection.

3. The saddle-type electric vehicle according to claim 2, wherein:
   the drive motor unit comprises a driven element which receives a drive force of the motor body;
   the motor body is disposed offset on a first side of a vehicle lateral center in the right-left direction, and
   the driven element is disposed on a second side of the vehicle lateral center in the right-left direction, and substantially opposite to the motor body.

4. The saddle-type electric vehicle according to claim 1, wherein the entire motor body is disposed rearwardly of the pivot connection.

5. The saddle-type electric vehicle according to claim 4, wherein:
   the drive motor unit comprises a driven element which receives a drive force of the motor body;
   the motor body is disposed offset on a first side of a vehicle lateral center in the right-left direction, and
   the driven element is disposed on a second side of the vehicle lateral center in the right-left direction, and substantially opposite to the motor body.

6. The saddle-type electric vehicle according to claim 1, wherein:
   the drive motor unit comprises a driven element which receives a drive force of the motor body;

the motor body is disposed offset on a first side of a vehicle lateral center in the right-left direction, and the driven element is disposed on a second side of the vehicle lateral center in the right-left direction, and substantially opposite to the motor body.

7. The saddle-type electric vehicle according to claim 6, wherein the driven element comprises an output shaft which is disposed rearwardly of a drive shaft of the motor body.

8. The saddle-type electric vehicle according to claim 7, wherein the output shaft is disposed rearwardly of the pivot connection.

9. The saddle-type electric vehicle according to claim 6, wherein the driven element comprises an output shaft which is disposed rearwardly of the pivot connection.

10. The saddle-type electric vehicle according to claim 6, wherein the drive motor unit comprises a motor casing which interconnects respective rear end portions of the down tube and the main frame section of the vehicle frame, and functions as an integral part of the vehicle frame.

11. The saddle-type electric vehicle according to claim 6, wherein:
the down tube comprises a down tube extension portion;
the down tube extension portion and the battery case are each respectively situated in an inclined position, and
the battery case is arranged so that an edge portion thereof is substantially parallel to the down tube extension portion.

12. The saddle-type electric vehicle according to claim 1, wherein:
the down tube is hollow and is configured to feed cooling air to the battery case; and
the battery case has an inlet and an outlet formed therein to permit a flow of cooling air therethrough for cooling the battery disposed in the battery case.

13. The saddle-type electric vehicle according to claim 1, wherein:
the down tube comprises a down tube extension portion;
the down tube extension portion and the battery case are each respectively situated in an inclined position, and
the battery case is arranged so that an edge portion thereof is substantially parallel to the down tube extension portion.

14. A saddle-type electric vehicle comprising:
a vehicle frame comprising a main frame section and a down tube attached to and extending downwardly from a front end of the main frame section;
a rear swing arm which is pivotally attached to the vehicle frame at a pivot connection;
a drive battery unit comprising a battery case and a battery housed inside of the battery case, the drive battery unit operatively attached to the down tube and situated under the main frame section of the vehicle frame; and
a drive motor unit operatively attached to the vehicle frame;
wherein the drive motor unit comprises:
a motor body disposed below the pivot connection of the rear swing arm, and
a motor casing which interconnects respective rear end portions of the down tube and the main frame section of the vehicle frame and functions as an integral part of the vehicle frame;
and wherein at least part of the motor body is disposed rearwardly of the pivot connection.

15. The saddle-type electric vehicle according to claim 14, wherein:
the drive motor unit comprises a driven element which receives a drive force of the motor body;
the motor body is disposed offset on a first side of a vehicle lateral center in the right-left direction, and
the driven element is disposed on a second side of the vehicle lateral center in the right-left direction, and substantially opposite to the motor body.

16. The saddle-type electric vehicle according to claim 15, wherein the battery case has an inlet and an outlet formed therein to permit a flow of cooling air therethrough for cooling the battery disposed in the battery case.

17. The saddle-type electric vehicle according to claim 15, wherein:
the down tube comprises a down tube extension portion;
the down tube extension portion and the battery case are each respectively situated in an inclined position, and
the battery case is arranged so that an edge portion thereof is substantially parallel to the down tube extension portion.

18. The saddle-type electric vehicle according to claim 14, wherein the battery case has an inlet and an outlet formed therein to permit a flow of cooling air therethrough for cooling the battery.

19. The saddle-type electric vehicle according to claim 14, wherein:
the down tube comprises a down tube extension portion;
the down tube extension portion and the battery case are each respectively situated in an inclined position, and
the battery case is arranged so that an edge portion thereof is substantially parallel to the down tube extension portion.

* * * * *